Dec. 8, 1959 K. SCHLESINGER 2,916,665

SAWTOOTH CURRENT GENERATOR

Filed Oct. 24. 1955 5 Sheets-Sheet 1

INVENTOR.
Kurt Schlesinger

BY
Mueller & Aichele
Attys.

SAWTOOTH CURRENT GENERATOR

Filed Oct. 24, 1955

INVENTOR.
Kurt Schlesinger
BY Mueller & Aichele
Attys.

Dec. 8, 1959 K. SCHLESINGER 2,916,665

SAWTOOTH CURRENT GENERATOR

Filed Oct. 24, 1955 5 Sheets-Sheet 3

INVENTOR.
Kurt Schlesinger
BY
Mueller & Aichele
Attys

INVENTOR.
Kurt Schlesinger
BY Mueller & Aichele
Attys.

Dec. 8, 1959 K. SCHLESINGER 2,916,665

SAWTOOTH CURRENT GENERATOR

Filed Oct. 24, 1955 5 Sheets-Sheet 5

INVENTOR.
Kurt Schlesinger
BY
Mueller & Aichele
Attys.

United States Patent Office 2,916,665

Patented Dec. 8, 1959

2,916,665

SAWTOOTH CURRENT GENERATOR

Kurt Schlesinger, La Grange, Ill., assignor to Motorola, Inc., Chicago, Ill., a corporation of Illinois Application October 24, 1955, Serial No. 542,414

11 Claims. (Cl. 315—27)

This invention relates generally to generators for producing a current wave of sawtooth wave form, and more particularly to such a generator which synthesizes the sawtooth current wave from a sine wave and a limited number of harmonics resulting from shock excitation of a multi-resonant network.

Generators for producing electric waves of current or voltage having a sawtooth wave form are in common usage in television transmitters and receivers, and in other applications. The standard television receiver uses deflection coils in which sawtooth current waves are developed for sweeping the beam in horizontal and vertical directions to produce a raster on the screen. Systems used to produce such a current wave at horizontal frequency include two tubes, a pentode and a diode which function as synchronous switches to provide an inductive load circuit which produces a linear trace, and a resonant network which provides a half-wave of oscillation for the retrace. Such systems require a substantial amount of power—particularly when wide angle deflection and high beam velocities are used. In modern sets having large wide-angle tubes and providing bright displays, the deflection system is the main power-consuming part of a television receiver. Attempts have been made to reduce the power by use of power feedback circuits and by increasing the efficiency of the circuits, but a substantial amount of power is still required in all known systems.

It is, therefore, an object of the present invention to provide an improved sawtooth current generator which provides the required sweep current and draws a minimum load current.

A further object of the invention is to provide a sawtooth current generator wherein current waves of fundamental and harmonic frequencies are combined to form a sawtooth current wave having a linear trace and a rapid retrace.

A further object of the invention is to provide an improved delay line which may be used as a multi-resonant network in a resonant sweep circuit.

A feature of the invention is the provision of a sawtooth wave generator including a coil having a multi-resonant circuit coupled thereto which is resonant at the fundamental frequency of the current wave and at a plurality of harmonics thereof, and means for applying a pulse at the fundamental frequency to the resonance circuit for shock exciting the same so that a sawtooth current wave is developed in the coil. The pulse may be produced by a vacuum tube or a thyratron and it is desired that a very large pulse be provided.

A further feature of the invention is the provision of a harmonic sweep generator wherein the multi-resonant network includes a plurality of sections tuned to frequencies to provide responses at the fundamental and a plurality of harmonic frequencies, the amplitudes of the harmonics being controlled so that a sawtooth wave having a substantial linear trace is produced. By properly adjusting the branch circuits, the amplitudes can be set so that a substantially linear trace is provided when using only a small number of harmonics.

A further feature of the invention is the provision of a sweep circuit having a multi-resonant network formed by a delay line somewhat shorter than half a wave length long and shorted at the remote end.

A still further feature is the provision of an improved delay line, having a plurality of coils formed as wafers which may be slanted to control the mutual inductance between the coils without affecting the self-inductance of the individual coils.

Further objectives, features and the attending advantages of the invention will be apparent from a consideration of the following description when taken in connection with the following drawings wherein.

Figure 3:
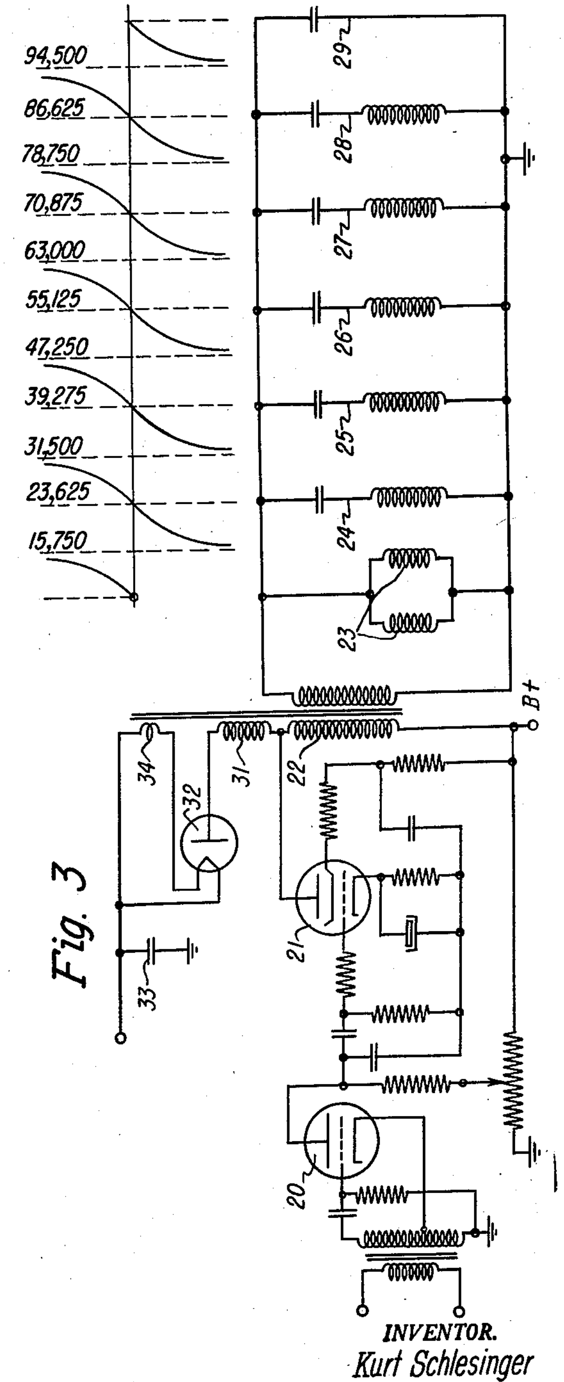
Fig. 3 illustrates a circuit using a multi-resonant ladder network.
Figure 6:
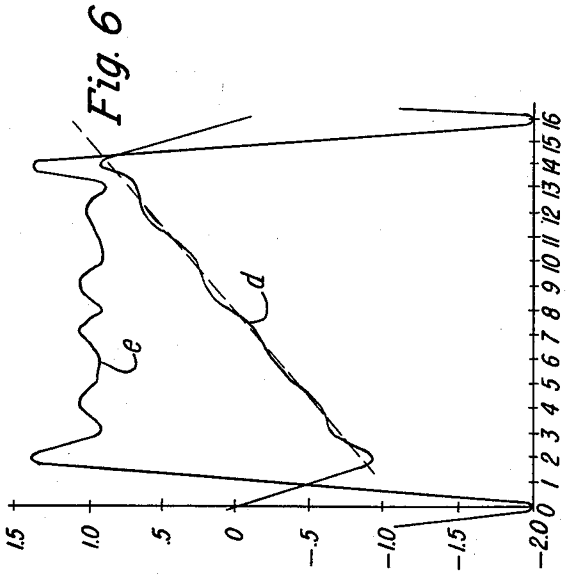
Figure 8:
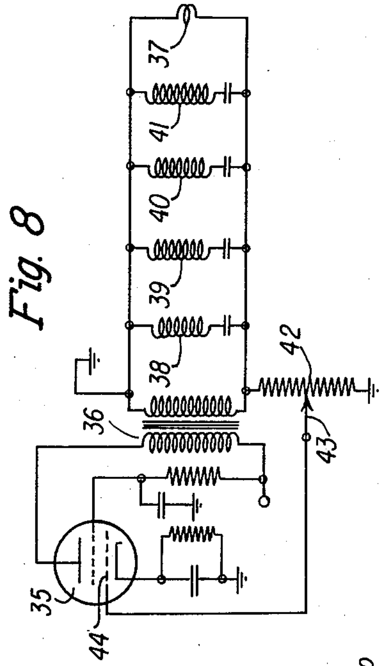
Figure 5:
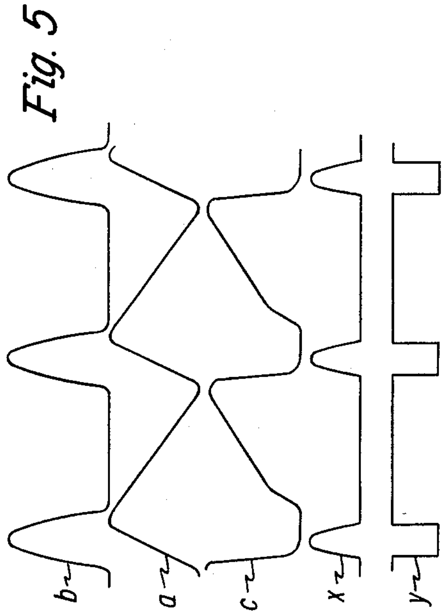
Figure 7:
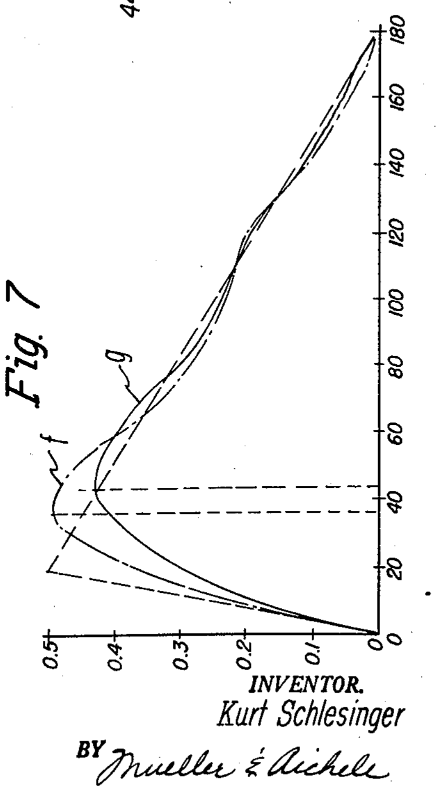
Figure 11:
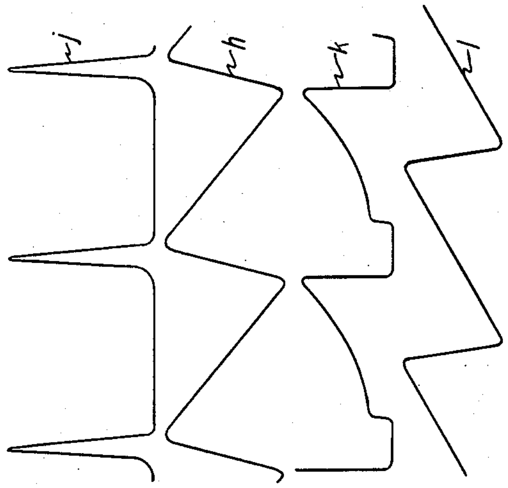
Figure 10:
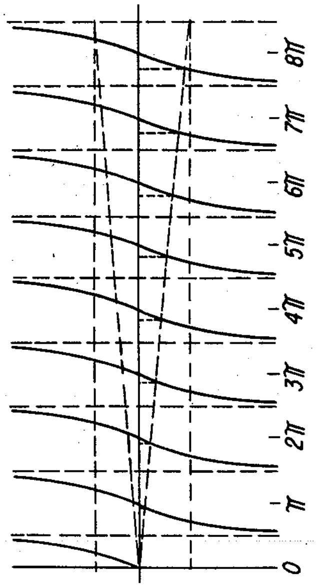
Figure 9:
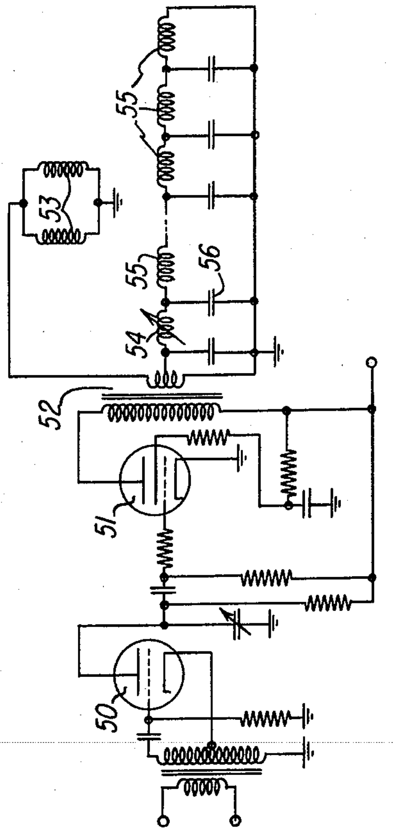
Figure 13:
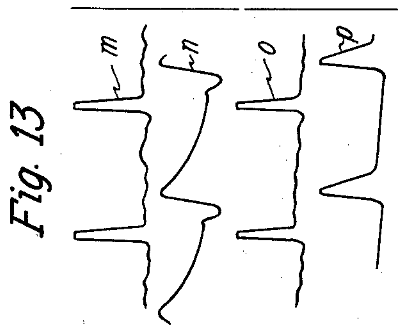
Figure 14:
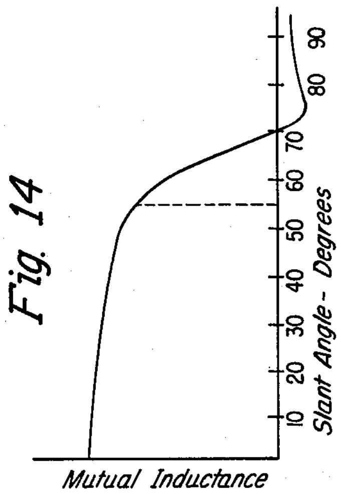
Figure 12:
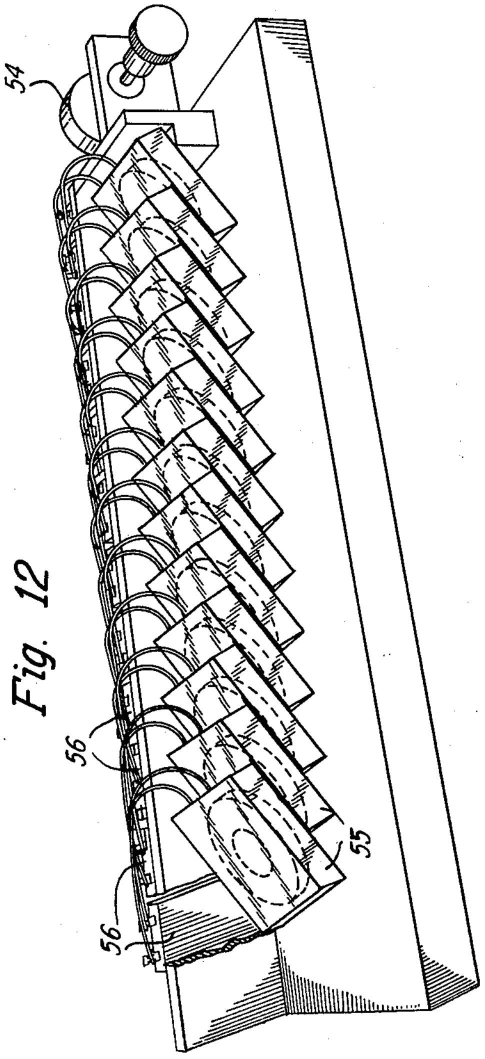
Figure 15:
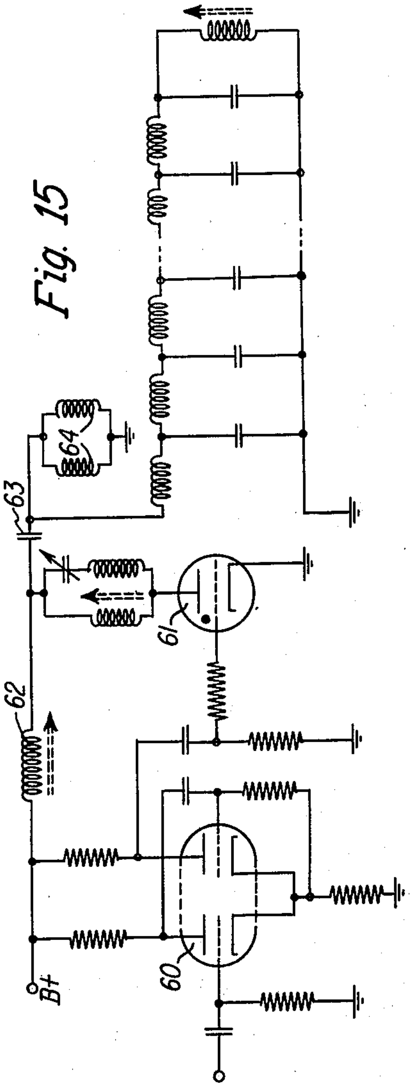
Figure 16:
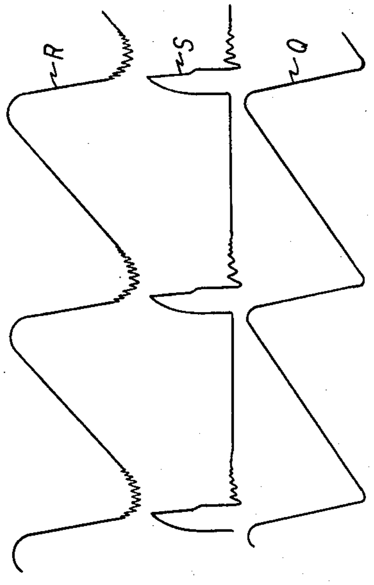
Figure 17:
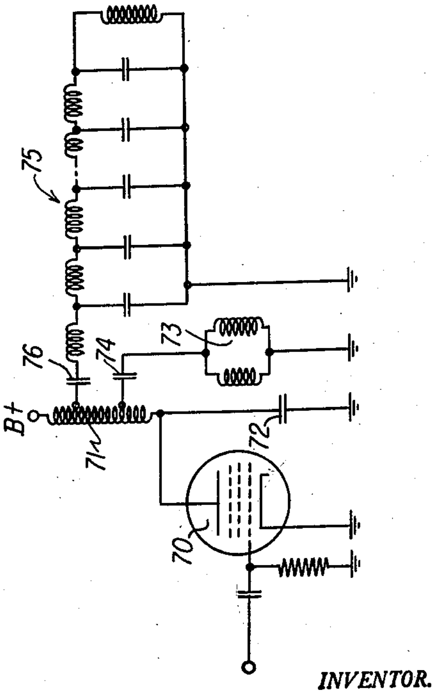

Fig. 5 includes curves showing the operation of the circuit of Fig. 3;

Figs. 6 and 7 are curves showing the wave resulting from the use of different numbers of harmonics;

Fig. 8 illustrates a self-oscillating circuit similar to Fig. 3;

Fig. 9 is a circuit utilizing a delay line as the multi-resonant network;

Figs. 10 and 11 are curves illustrating the operation of the circuit of Fig. 9;

Fig. 12 illustrates the mechanical construction of the delay line;

Figs. 13 and 14 include curves illustrating the operation of the delay line;

Fig. 15 shows a multi-resonant delay line circuit shock excited by a thyratron;

Fig. 16 includes curves showing the operation of the circuit of Fig. 15;

Fig. 17 shows an alternate circuit using a delay line; and

Figure 18:
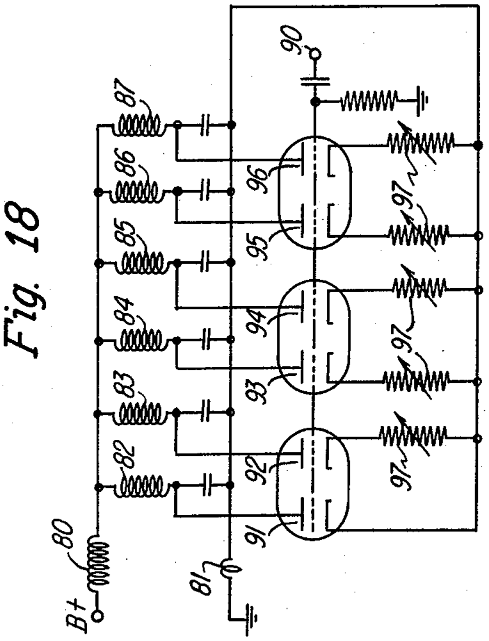

Fig. 18 is a multi-resonant circuit with the branches excited by separate oscillators.

In practicing the invention, there is provided a sweep system wherein a current wave of sawtooth wave form is built up by the use of a plurality of harmonics of sinusoidal wave form. This may be used for deflecting the beam of a cathode ray tube, with the current being developed in the yoke for the tube. The yoke is coupled to a transformer to which is also coupled a multi-resonant network. Pulses of current are applied to the transformer to shock excite the multi-resonant network. A multi-resonant ladder network including sections tuned to frequencies related to the harmonics of the desired frequency may be used. In such case it has been found that a linear trace can be provided by using as few as four harmonics by properly adjusting the amplitude of the harmonics with respect to the fundamental wave. However to provide faster retrace, additional harmonics may be required. A delay line may also be used as the multi-resonant network. In such a case, the delay line required is shorter than a half wave and is shorted at the remote end. An improved delay line composed of wafer coils which may be slanted to change the mutual inductance therebetween provides control of the characteristics of the delay line. By slanting the wafers of the delay line the mutual inductance is varied while the self inductance is retained. This construction has been found to minimize dispersion.

Figure 1:
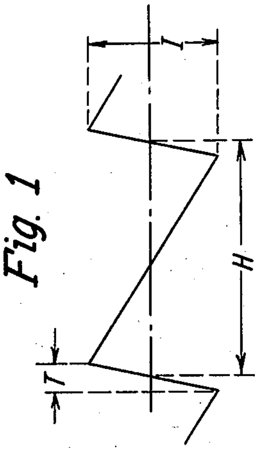
Fig. 1 is a curve of an ideal sawtooth wave.

Referring now to the drawings, in Fig. 1 there is shown the wave form of a sawtooth wave as required for providing scanning of a cathode ray beam. The wave form of Fig. 1 is an ideal sawtooth wave with the retrace T consuming 11% of the complete period of the cycle H. The Fourier expansion for such a wave is given by the equation:

$$i=I\frac{1}{\pi}\frac{1}{1-p}\sum_{n=1}^{\alpha} a_n \sin n\,wt$$

where:

$$p=T/H \text{ and } a_n=\frac{1}{n}\cdot\frac{\sin n\pi t}{n\pi t}$$

In a practical system it is necessary to limit the system to the first N harmonics. In determining the number of harmonics required it must be considered that the number of harmonics control the retrace percentage $p_N$. The values of $p_N$ for various values of N are shown in the graph Fig. 2. Specifically, it is found that to obtain a retrace percentage of 15%, all harmonics up to $N=8$ must be included. The number of harmonics also affects the linearity of the traces of the wave but relatively linear traces can be provided with as few harmonics as 4 as will be set forth more particularly. Quite generally, it is found that a sweep wave composed of only the first N positive Fourier terms requires 37 percent more retrace time, and has only 73 percent of the flyback speed, than if all harmonics were used.

The harmonics required to synthesize a sawtooth wave by sine wave components may be provided by a multi-resonant network. Fig. 3 shows a circuit of this type which has been found to provide a sawtooth wave having a substantially linear trace. In this circuit an oscillator including the triode tube 20 applies a wave to an amplifier 21 which produces pulses in the transformer 22. Connected to the secondary of the transformer 22 are inductors 23 in which the sawtooth current is to be developed, which may be the deflection coils of a cathode ray tube. Connected across the transformer is a ladder network including a plurality of resonant circuits 24, 25, 26, 27 and 28 and condenser 29. The resonant circuits each include a condenser and an inductor, with the circuits being tuned to provide responses at the harmonics of the frequency of the sawtooth wave to be developed. The oscillator 20 and amplifier 21 provide pulses at the fundamental frequency of the sawtooth wave. The curves positioned above the resonant circuits in Fig. 3 show the frequency response thereof. The individual resonant circuits are tuned to frequencies approximately midway between the sweep harmonics as shown on the figure. The fundamental sweep frequency, the harmonics and the frequencies at which the branch circuits are resonant are all listed on Fig. 3.

Fig. 5 illustrates the waves produced by the system of Fig. 3, with curve *a* showing the sawtooth current wave which is produced in the yoke, curve *b* showing the voltage across the yoke, and curve *c* showing the current in the cathode of the amplifier tube 21. These three curves are taken from oscillograms derived from the actual circuit and are shown in their time phase relationship.

Figure 4:
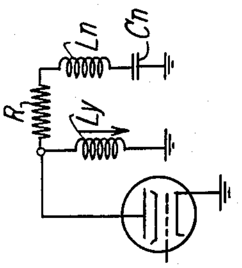
Fig. 4 illustrates one mesh of the network.

The wave form of the exciting current may be considered by looking at each branch of the multi-resonant network separately. Fig. 4 shows one branch of the network, represented $L_nC_n$, and to excite this branch a pulse of current is required. The actual exciting current of all the branches is the sum of the plate currents required for the individual branches and is also a wave of current pulses. As shown in curve *c* of Fig. 5, the multi-resonant network is shock excited by truncated sawtooth pulses. It is recognized that various types of exciting current waves can be used such as the positive pulse wave shown by curve *x* of Fig. 5, which may be produced by plate current in a cut off tube, or a periodically interrupted direct current as shown by curve *y*.

It is customary to derive high voltage from the horizontal sweep system of a television receiver and high voltage may be derived from the circuit shown in Fig. 3. This is accomplished by providing a high voltage winding 31 on the transformer 22 and rectifying the voltage pulse developed therein by diode 32 to provide a high voltage across the condenser 33. A single turn coil 34 may provide heater current for the rectifier 32 in a known manner.

Figure 2:
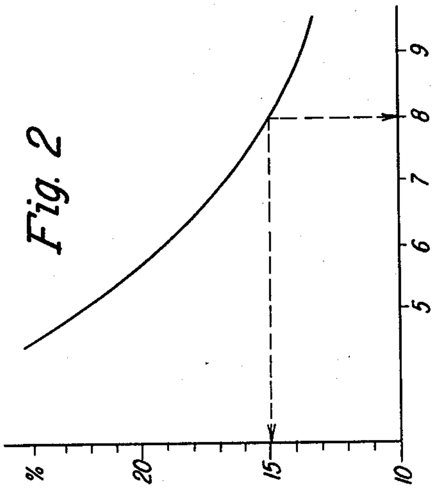
Fig. 2 shows the relation between the number of harmonics and the retrace percentage in a synthesized wave.

As previously stated, and as shown in Fig. 2, the retrace time depends upon the number of harmonics used. In the system of Fig. 3, six harmonics are provided resulting in a retrace percentage of approximately 18%. This is too long for use in television scanning systems wherein a maximum percentage of 15% is allowed. It will be apparent that by the use of two more harmonics, for a total eight harmonics, the retrace percentage is brought down to the required limit. Fig. 6 shows curves wherein eight harmonics are used, with the curve *d* showing the sawtooth current wave in the yoke and the curve *e* the voltage across the yoke. To provide as many as eight branches in a ladder network has the difficulty that the branch inductance increases rapidly for higher harmonics, and the effect of the higher order resonators diminish because of the loose coupling to the yoke.

It is important to note that the linearity of the trace portion of the wave can be held quite accurately by a system as shown in Fig. 3. Curve *d* of Fig. 6 shows a highly linear trace produced by using eight harmonics. Fig. 7 shows curves wherein only four harmonics are used with curve *f* showing the trace of the wave when using the amplitudes theoretically required for the four harmonic components. By adjusting these amplitudes, a wave can be produced having a much more linear trace, as shown by the curve *g* of Fig. 7. The following table shows the relation of the amplitudes of the harmonic components of the wave:

| | $a_1$ | $a_2$ | $a_3$ | $a_4$ |
|---|---|---|---|---|
| True Fourier Coefficients | 0.31 | 0.145 | 0.088 | 0.056 |
| | | Curve *f*, Fig. 7 | | |
| Modified Fourier Coefficients | 0.342 | 0.145 | 0.068 | 0.025 |
| | | Curve *g*, Fig. 7 | | |

It is apparent from the above table that the trace distortion is reduced from about 15% to about 5% by using the modified components. However, the percent duration of the retrace is increased in the modified series as shown in Fig. 7. Figs. 6 and 7 both show computed curves and waves actually produced have more linear traces than the computed curves.

In Fig. 8 there is illustrated a system similar to that shown in Fig. 3 wherein the separate oscillator is eliminated and the amplifier is made self-oscillating. The tube 35 feeds the transformer 36 as in the system of Fig. 3, with the yoke or other element in which the sawtooth current is developed being indicated by the inductor 37. The resonant branches 38, 39 and 40, 41 provide a multi-resonant network. One side of the ladder network is grounded and the other side is connected to ground through resistor 42 across which a pulse wave is developed. A portion of this pulse is derived from tap 43 on resistor 42 and applied to the grid 44 of the tube 35 forming in effect a feedback circuit so that the tube continues in operation as a self running system. A high voltage may be derived from the system of Fig. 8 in the manner shown in Fig. 3.

It has been found that the multi-resonant network required for the sawtooth current wave synthesis described can be provided by a shorted transmission line. A circuit using a shorted transmission line is shown in Fig. 9. The input reactance of a shorted transmission line is shown in Fig. 10. It is obvious from this figure that, if the line is shunted across a yoke-inductance, the line will resonate at a plurality of points, and by proper design of the delay line the resonant spots can be made to correspond to the consecutive harmonics of the frequency of the wave to be developed. The required length of line is shown by the equation:

$$T=\frac{H}{2}\left(1-\frac{1}{4N}\right)$$

where H is the wave length at the frequency involved and N is the number of harmonics desired. N includes the first harmonic or fundamental frequency and the 7 consecutive higher harmonics. As previously stated, eight harmonics are sufficient to provide the retrace desired. Accordingly the line becomes three percent less than a half wave length at the frequency involved. Considering a wave having a frequency of 15,750 cycles as required for horizontal deflection in a television system, the period of such a wave is 63 microseconds, and the delay required in the line is ½×97% of 63 or 30.5 microseconds.

In order for the resonant points along the line to have a harmonic relationship as required, the dispersion along the line must be low. Also, at the highest harmonic used, the terminating impedance across the line should not exceed the characteristic impedance of the line. The line impedance should be N times higher than the terminating inductive reactance, taken at the sweep frequency. Accordingly, when using a high reactance yoke, a step down transformer must be provided between the yoke and the line so that the line impedance is effectively higher than the reflected yoke reactance.

Referring now more specifically to Fig. 9, the oscillator 50 and amplifier 51 may be generally similar to the corresponding components in the system of Fig. 3. The output transformer 52 has a secondary with a tap thereon, with the yoke 53 being connected across the entire secondary and the delay line connected to the tap. The first section of the delay line includes a variable inductor 54, with the remaining sections having constant fixed inductors 55 and capacitors 56. A total of twelve additional sections have been found to provide the desired characteristics.

In Fig. 11 the curve *h* shows the current wave produced in the yoke 53, curve *j* shows the voltage across the yoke, curve *k* is the cathode current of the tube 51, that is, the exciting current, and curve *l* is the current at the shorted end of the line. The current wave at the end of the line is delayed by half a wave length, and since the odd harmonics have their signs inverted by the line, the slope of the current wave is inverted.

Fig. 12 illustrates the mechanical construction of a delay line or line resonator in accordance with the invention. The variable inductor 54 is provided on the right side. It will be noted that each coil 55 is provided as a separate flat wafer, with the coil being imbedded in a plastic material. Heavy copper wire is used in the coil to reduce the resistance and power dissipation. The wafers are mounted in slanting positions and by changing the angle of slant, so that the engaging sides are slid with respect to each other, the portions of the coils in flush engagement with each other can be varied. The mutual inductance between the coils may thereby be controlled while the self inductance of the individual is held substantially constant. This permits compensation for dispersion by using a desired angle of slant. Optimum results were obtained with a slant of 55° in the line illustrated. Other pertinent characteristics of the line are as follows:

| | |
|---|---|
| Impedance ____________ohms__ | 250 |
| Cutoff frequency ________kilocycles__ | 160 |
| Number of sections ____________ | 12 |
| Direct current resistance ________ohms__ | 8 |
| Power handling capacity ________watts__ | 20 |

Fig. 13 shows the effect of the line on sync pulses transmitted therethrough with the wafers having different angles of slant. When the coils are positioned vertically and flush with each other, that is, with no slant, the applied pulses shown by curve *m* are distorted as shown by curve *n*. When the wafers are set at angles of 55°, the pulse wave shown by curve *o* produces the wave shown by curve *p*. It will be noted that reflections present in curve *n* are eliminated in curve *p*.

Fig. 14 shows the variations of mutual inductance between adjacent coil wafers with the slant angle of the wafers. It will be noted that the mutual inductance remains substantially constant for slant angles from 0 to 50°, and then changes relatively rapidly from 50° to 70°. The mutual inductance actually changes sign and becomes negative at slant angles above 70°. By operating in the range around 55°, precise control of the mutual inductance at positive values can be had.

Fig. 15 illustrates a system generally similar to that of Fig. 9 wherein a thyratron exciting tube is used. A multi-vibrator oscillator 60 is provided which feeds the output stage including thyratron 61. A miniature hydrogen thyratron such as type VC–1258 has been found to be suitable for this application. By making the inductor 62 and the capacitor 63 resonant at the operating frequency, a voltage step up of 3–1 can be provided making a high voltage available from a relatively low voltage B plus supply. By this expedient a sufficiently high voltage is obtained to use pulse excitation as shown in curve *x* of Fig. 5. By using a low inductance yoke 64, a matching transformer is not required for coupling the delay line to the yoke. The curves of Fig. 16 show the operation of the circuit of Fig. 15 with curve Q showing the current wave provided in the yoke 64, curve R showing the voltage across the yoke, and curve S showing the thyratron cathode current.

Fig. 17 shows a system generally similar to that of Fig. 15 wherein a vacuum tube is used instead of a thyratron, a pulse wave is applied to the pentode tube 70 which is energized through a resonant circuit including inductor 71 and condenser 72. The condenser 72 provides a plate potential for the tube 70 substantially greater than the B plus potential so that a large current pulse is produced when the tube conducts. The operating potential for the pentode may be ten times that of the B plus potential or even more by properly selecting the values of inductor 71 and condenser 72. In Fig. 17 the yoke 73 is connected through blocking condenser 74 to a tap on the inductor 71 and the delay line 75 is connected through condenser 76 to a second tap which is at a lower impedance point. This matches the low impedance delay line to a higher impedance yoke.

In Fig. 18 there is shown a multi-resonant harmonic sweep synthesis system wherein the sine wave components are provided by tuned branches of a ladder network, with each branch being part of a separate oscillator. The yoke 80 is connected between B plus and one side of the ladder and the other side of the ladder is connected through inductor 81 to ground. The branches 82, 83, 84, 85, 86 and 87 each include a coil and inductor tuned to a harmonic of the sweep frequency. Synchronizing pulses are applied from input terminal 90 to the grids of the triode sections 91, 92, 93, 94, 95 and 96 which together with the tuned branches form oscillators. The cathodes of the triode sections 92 to 96 inclusive are connected to variable resistors 97 to control the relative amplitudes of the oscillations developed in the triode sections. The sine waves in the branches of the ladder network are combined to provide a sawtooth current wave in the yoke in the same manner as in the prior embodiments. The amplitudes of the separate harmonic waves control the linearity of the synthesized wave. The phases of all oscillators are locked, once per line, by synchronizing pulses applied at terminal 90.

It is, therefore, seen that arrangements have been provided for synthesizing a sawtooth current wave from harmonic sinusoidal components. These systems have been found to produce adequate current for deflecting the cathode ray tube in a television system. The circuits used are relatively simple and can be constructed at reasonable cost. The delay line embodiments are particularly advantageous in that rapid retrace and good linearity are provided.

The delay line construction makes it possible to compensate for dispersion and the delay line having slanted wafers is believed to be highly advantageous in many applications. The construction using plastic embedded coils may be produced at reasonable cost and provides a highly satisfactory unit.

I claim:

1. A system for producing a current wave of sawtooth wave form in inductance means including in combination, a multi-resonant network coupled to said inductance means, means coupled to said network for producing therein current pulses having a repetition rate corresponding to the desired frequency of the sawtooth wave, said multi-resonant network including a delay line cooperating with said inductance means to provide resonance at N consecutive harmonics of said desired frequency starting with the fundamental frequency, said delay line being shorted at one end and coupled at the other end thereof to said inductance means, said delay line having a length equal to half a wave length at said desired frequency times $$\left(1-\frac{1}{4N}\right)$$

said multi-resonant network being shock excited by said pulses to produce current components in the inductance means providing a current wave of substantially sawtooth wave form therein.

2. A system for producing a current wave of sawtooth waveform in a deflection yoke for a cathode ray tube including in combination, a multi-resonant network coupled to said deflection yoke, means coupled to said network for producing therein current pulses having a repetition rate corresponding to the desired frequency of the sawtooth wave, said multi-resonant network including a delay line cooperating with said deflection yoke to provide resonance at eight consecutive harmonics of said desired frequency starting with the fundamental frequency, said delay line being shorted at one end and coupled at the other end thereof to said deflection yoke, said delay line having a length substantially three percent shorter than half a wave length at said desired frequency, said multi-resonant network being shock excited by said pulses to produce current components in said deflection yoke providing a current wave of substantially sawtooth wave form therein.

3. A system for producing a current wave of sawtooth wave form in inductance means including in combination, a multi-resonant network coupled to said inductance means, means coupled to said network for producing therein current pulses having a repetition rate corresponding to the desired frequency of the sawtooth wave, said multi-resonant network including a delay line cooperating with said inductance means to provide resonance at a plurality of consecutive harmonics of said desired frequency starting with the first harmonic, said delay line having a length substantially three percent shorter than half a wave length at said desired frequency and being shorted at one end and coupled at the other end to said inductance means, said multi-resonant network being shock excited by said pulses to produce current components in said inductance means providing a current wave of substantially sawtooth wave form therein, said delay line including series inductance and shunt capacity with said series inductance being formed by a plurality of wafer like coils which are positioned with side faces adjacent each other, with the coils slanted at an angle with respect to the common center line of the coils to provide a predetermined positive value of mutual inductance between adjacent coils.

4. A system for producing a current wave of sawtooth wave form in an inductance coil including in combination, a multi-resonant network coupled to said inductance coil, means coupled to said network for producing therein current pulses having a repetition rate corresponding to the desired frequency of the sawtooth wave, said multi-resonant network including a delay line cooperating with said inductance coil to provide resonance at a plurality of consecutive harmonics of said desired frequency starting with the first harmonic, said delay line being shorted at one end and coupled at the other end thereof to said inductance coil, said multi-resonant network being shock excited by said pulses to produce current components in the inductance coil providing a current wave of substantially sawtooth wave form therein, said delay line having a plurality of sections with at least one section including a coil having means for varying the inductance thereof, a plurality of sections including series coils and shunt condensers with said coils thereof being embedded in plastic sealing material to form flat wafers, and means supporting said wafers with the side faces thereof engaging each other, said wafers being slanted at an angle with respect to positions in which adjacent wafers have the side faces thereof flush with each other to thereby provide a predetermined positive value of mutual inductance between adjacent coils.

5. A system for producing a current wave of sawtooth wave form in inductance coil means including in combination, a multi-resonant network coupled to said inductance coil means, a current pulse generator coupled to said network for producing therein current pulses having a repetition rate corresponding to the desired frequency of the sawtooth wave, said pulse generator including condenser means and inductor means connecting said condenser means to a source of potential for charging the same therefrom, and valve means for discharging said condenser means to produce said current pulse, said condenser means and said inductor means being tuned to said desired frequency so that a high voltage is built up across said condenser means by resonance action, said multi-resonant network including a delay line cooperating with said inductance coil means to provide resonance at a plurality of consecutive harmonics of said desired frequency starting with the first harmonic, said delay line being shorted at the other end and coupled at the other end thereof to said inductance coil means, said multi-resonant network being shock excited by said pulses to produce current components in the inductance coil means providing a current wave of substantially sawtooth wave form therein.

6. A system for producing a current wave of sawtooth wave form in a deflection yoke for a cathode ray tube including in combination, a multi-resonant network coupled to said deflection yoke, a current pulse generator coupled to said network for producing therein current pulses having a repetition rate corresponding to the desired frequency of the sawtooth wave, said pulse generator including condenser means and inductor means connecting said condenser means to a source of potential for charging the same therefrom, and thyratron valve means for discharging said condenser means to produce said current pulse, said condenser means and said inductor means being tuned to said desired frequency so that a high voltage is built up across said condenser means by resonance action, said multi-resonant network including a delay line cooperating with said deflection yoke to provide resonance at a plurality of consecutive harmonics of said desired frequency starting with the first harmonic, said delay line being shorted at one end and having the other end thereof coupled to said deflection yoke, said multi-resonant network being shock excited by said pulses to produce current components in said deflection yoke providing a current wave of substantially sawtooth wave form therein.

7. A system for producing a current wave of sawtooth wave form in a deflection yoke for a cathode ray tube including in combination, a pulse generator including condenser means and inductor means connecting said condenser means to a source of potential for charging the same therefrom, and valve means for discharging said condenser means to produce a current pulse in said inductor means, said condenser means and said inductor means being tuned to said desired frequency so that a high voltage is built up across said condenser means by resonance action, a multi-resonant network coupled to said inductor means, means coupling the deflection yoke to said inductor means, said multi-resonant network including a delay line cooperating with the deflection yoke to provide resonance at a plurality of consecutive harmonics of said desired frequency starting with the first harmonic, said delay line being shorted at one end and having the other end thereof coupled to said inductor means, said multi-resonant network being shock excited by said pulses to produce current components in the deflection yoke providing a current wave of substantially sawtooth wave form therein.

8. A delay line for operating at a predetermined frequency including in combination a plurality of sections formed by series coils and shunt condensers, said line having a length substantially three percent shorter than half a wave length at said predetermined frequency at least one section including a coil having means for varying the inductance thereof, a plurality of sections including coils and condensers with said coils thereof being embedded in plastic sealing material to form flat wafers, and means supporting said wafers with the side faces thereof engaging each other, said wafers being slanted at an angle with respect to positions in which adjacent wafers have the side faces thereof flush with each other, with such angle being selected to provide a predetermined positive value of mutual inductance between adjacent coils and thereby control a characteristic of the delay line.

9. A delay line having series inductance and shunt capacity and including in combination, a plurality of sections each including a coil, at least one of said coils including means for varying the inductance thereof, a plurality of said coils being embedded in plastic sealing material to form flat wafers which are positioned with side faces in engagement with each other, and means supporting said wafers in positions slanted at an angle with respect to positions in which adjacent wafers have the side faces thereof fully flush with each other, with such angle being adjustable to thereby control the extent of engagement of the side faces of the wafers and the mutual inductance between adjacent coils so that the mutual inductance varies from positive values through zero to negative values.

10. A delay line having series inductance and shunt capacity and including coil means having a plurality of series connected turns forming the inductance of the delay line, and means for supporting said coil means so that the turns thereof are slanted at an angle differing from a right angle with respect to a common center line through the turns, with the angle of the turns controlling the mutual inductance between the turns and being adjustable to provide mutual inductance varying from positive values through zero to negative values, and thereby controlling a characteristic of the delay line.

11. A delay line for operating at a predetermined frequency and having a length substantially three percent shorter than half a wave length at the predetermined frequency, said delay line including coil means having a plurality of turns connected in series, means providing capacity between said turns and a reference potential, and means for supporting said coil means so that the turns thereof are slanted with the axis of each turn being at an angle of substantially fifty-five degrees from the common center line through the turns, and with the angle of the turns controlling the mutual inductance between the turns and providing a predetermined positive value of mutual inductance therebetween.

References Cited in the file of this patent

UNITED STATES PATENTS

| | | |
|---|---|---|
| 2,149,077 | Vance | Feb. 28, 1939 |
| 2,499,080 | Webb | Feb. 28, 1950 |
| 2,560,568 | Hammond et al. | July 17, 1951 |
| 2,589,076 | Hancock et al. | Mar. 11, 1952 |
| 2,608,672 | Miller | Aug. 26, 1952 |
| 2,659,052 | Bess | Nov. 10, 1953 |
| 2,702,372 | Hickey | Feb. 15, 1955 |
| 2,708,728 | Hulst | May 17, 1955 |
| 2,823,354 | Lubkin | Feb. 11, 1958 |